United States Patent
Brands et al.

(10) Patent No.: US 8,542,007 B2
(45) Date of Patent: Sep. 24, 2013

(54) INDUCTIVE POSITION SENSOR

(75) Inventors: Robert Brands, Dortmund (DE); Wolfgang Büsser, Dortmund (DE)

(73) Assignee: Elmos Semiconductor AG, Dortmund (DE)

( * ) Notice: Subject to any disclaimer, the term of this patent is extended or adjusted under 35 U.S.C. 154(b) by 301 days.

(21) Appl. No.: 12/922,667

(22) PCT Filed: Mar. 26, 2008

(86) PCT No.: PCT/EP2008/053544
§ 371 (c)(1),
(2), (4) Date: Dec. 14, 2010

(87) PCT Pub. No.: WO2009/118042
PCT Pub. Date: Oct. 1, 2009

(65) Prior Publication Data
US 2011/0101968 A1 May 5, 2011

(51) Int. Cl.
*G01B 7/14* (2006.01)
(52) U.S. Cl.
USPC .................................................. 324/207.17
(58) Field of Classification Search
USPC .................................................. 324/207.17
See application file for complete search history.

(56) References Cited

U.S. PATENT DOCUMENTS

| | | |
|---|---|---|
| 2002/0041074 A1 | 4/2002 | Benz et al. |
| 2002/0179339 A1 | 12/2002 | Ely et al. |
| 2005/0030010 A1 | 2/2005 | Jones et al. |

FOREIGN PATENT DOCUMENTS

| | | |
|---|---|---|
| EP | 1 736 736 A2 | 12/2006 |
| WO | 03/067181 A2 | 8/2003 |
| WO | 2004/020936 A2 | 3/2004 |
| WO | 2004/072653 A2 | 8/2004 |
| WO | 2007/068765 A1 | 6/2007 |

OTHER PUBLICATIONS

International Search Report and Written Opinion of corresponding PCT Application No. PCT/EP2008/053544 dated Jan. 23, 2009 (8 pages).

*Primary Examiner* — Reena Aurora
(74) *Attorney, Agent, or Firm* — Renner, Otto, Boisselle & Sklar, LLP (57) ABSTRACT

In an inductive position sensor for determining the position, particularly the rotation angle, of a movable element, at least two subsystems are provided, which each have second transmitting units with an actuating unit, an oscillating circuit on the movable element, and a receiving unit with an evaluating unit. According to the invention, it is provided that the operation of the individual subsystems is carried out alternately. Thus, if one subsystem is operating, all other subsystems are deactivated. In this way, all subsystems are individually operated in a consecutive manner. The synchronization required to do so is provided by a non-galvanic coupling of the subsystems, and in particular by an inductive coupling by way of preferably existing inductances of the subsystems.

10 Claims, 4 Drawing Sheets

INDUCTIVE POSITION SENSOR

BACKGROUND OF THE INVENTION

1) Field of the Invention

The invention relates to an inductive position sensor for determining the position of a movable element, and particularly for determining the rotation angle of a movable element. However, the invention can also be used in a linear position sensor.

2) Description of Related Art

In a large variety of technical fields and for the most different uses, it may be required to detect, with the aid of measurement technology, the position of movable elements or parts of a components. An example for the use of an inductive rotary position sensor, taken from the field of automotive technology, is the detection of the position of the accelerator, the position of the throttle valve, the filling level of the gas tank, or the vehicle height level (i.e. degree of compression of vehicle suspension). The advantage of inductive sensor systems resides in the contactless capturing of a path position or rotary position.

Figure 1:
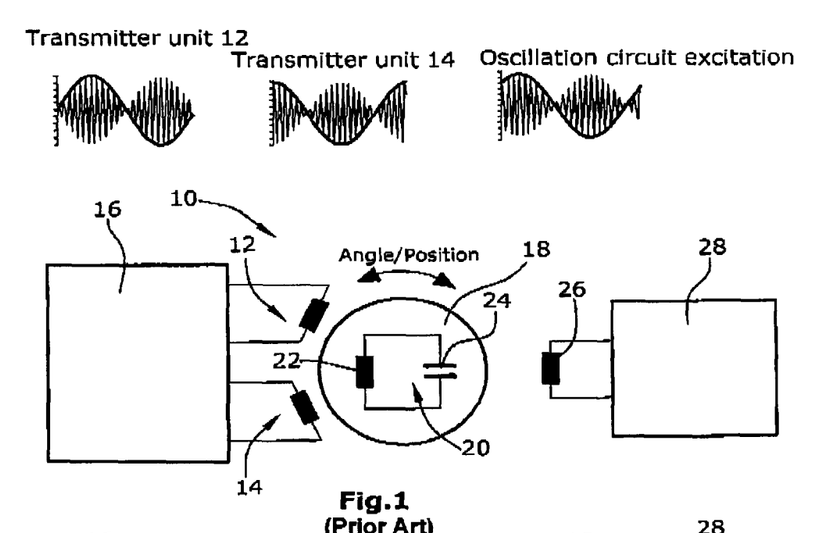
FIG. 1 is a view illustrating the basic principle of an inductive position sensor of the one-channel type.

The invention relates particularly to position sensors of the type schematically exemplified in FIG. 1 and described e.g. in WO-A-2004/072653, WO-A-2003/067181 and WO-A-2007/068765. FIG. 1, which will be described hereunder, illustrates a one-channel inductive position sensor for use as a rotary position sensor.

Said sensor 10 comprises two transmitter units 12,14 in the form of transmitter coils, each of them generating an electromagnetic alternating field with a position-dependent amplitude. Said two transmitter units 12,14 are controlled by a control unit 16, as will still be described further below.

Sensor 10 is further provided with a movable element 18 which in the present example is formed as rotary disk or another type of rotary element. Said movable element comprises an oscillating circuit 20 formed of an inductance 22 and a capacitance 24. Said element 18 or said oscillating circuit 20 will rotate within a total electromagnetic alternating field generated by the overlap of the two electromagnetic alternating fields of the two transmitter units 12,14. Depending on the respective rotational position, said oscillating circuit 20 will produce an electromagnetic alternating field of the same frequency as the alternating fields of the two transmitter units 12,14, wherein the alternating field emitted by oscillating circuit 20 is shifted in phase relative to the two other alternating fields. The degree of said phase shift is a measure of the present rotational position of element 18. The signal of oscillating circuit 20 will be received by a receiving unit 26 formed as a receiver coil and, within an analysis unit 28, said received signal will be processed and, particularly, there will be determined the phase position of said signal relative to the signals fed to the transmitter units 12,14.

The transmitter coils and respectively transmitter units 12,14 will modulate low-frequency oscillations of the same frequency (e.g. 4 KHz) onto a high-frequency (e.g. 4 MHz) carrier signal which is identical for both transmitter coils. The modulated oscillations of the two transmitter coils are phase-shifted by 90° relative to each other. Both transmission signals will energize the LC oscillating circuit 20. The strength of said excitation is proportionate to the coupled inductivity between the respective transmitter coils and the oscillating-circuit coil (inductance 22). Depending on the respective position of said movable element 18, each transmission signal will be coupled with a different strength into oscillating circuit 20. Within oscillating circuit 20, a modulated oscillation will be generated which has the same frequency as the transmitted modulation signal. The modulated oscillation of oscillating circuit 20 will have a phase shift, relative to the transmitted modulation, which is dependent on the amplitude ratio of the modulation signals—coupled into oscillating circuit 20—of the transmitter coils. The signal generated within oscillating circuit 20 will be forwarded to the receiver coil (receiver unit 26), as already mentioned above.

The mathematical approach forming the basis of the above measuring principle can be explained as follows. When adding to each other two sinusoidal oscillations of the same frequency which are phase-shifted by 90° relative to each other, a sinusoidal oscillation of the same frequency will be generated. The phase shift of the thus generated oscillation is a function of the amplitude ratio between the two added oscillations.

For many uses, an inductive position sensor with two or more channels is required. Then, said arrangement shown in FIG. 1, comprising the two transmitter units 12,14 with evaluation unit 16, the oscillating circuit 20 and the receiver unit 16 with evaluation unit 28 in the form of two subsystems, is provided twice and or more times. It is, however, not absolutely required that a separation exists between the subsystems; in the normal case, both channels are coupled into each other. A two-channel inductive sensor is shown, e.g., in FIG. 2 and is described, e.g., in US-A-2002/0179339 as well as in WO-A-2007/068765.

The known inductive sensors of the above mentioned design have been basically found useful in practice. However, for some uses, the current consumption of such sensors is occasionally too high. Further, since no sine or cosine signals are used at the input side, which is of advantage for an effective use of the system, a quite massive post-processing expenditure in the form of filtration processes and the like will be necessitated at the output side, which not desirable either and will increase the space requirement on an ASIC.

Known from US-A-2005/0030010 is an inductive position sensor of the type mentioned and described above, which is operated using a PWM signal as a modulation signal. Also this sensor requires an increased expenditure for signal post-processing, thus rendering the overall arrangement more complicated. For the filtration of the modulation signal so as to obtain the sinusoidal or cosinusoidal shapes, a low-pass filter with relatively low limiting frequency will be required, which will entail the need for additional circuit components and thus cause an increased space requirement in the ASIC.

A method for generating the transmission signals that is advantageous for the monolithic integration resides in the generation of square-wave signals whose shape, with filtration over time, corresponds to the desired signal shape of the modulated transmission signal. The use of square-wave signals allows for high efficiency, which is achieved by avoidance of losses in the integrated circuit. Generating square-wave signals further makes it possible to achieve a particularly high linearity of the sensor signal because of the high relative accuracy with which the square wave signals can be generated in integrated circuits. Square-wave signals can be used both for generating the carrier signal and for generating the modulation signal.

A method for generating the modulation signal that is of special advantage for integration resides in using either a pulse-density-modulated sequence of carrier-frequency square wave pulses whose shape, with filtration over time, corresponds to the desired modulation signal, or a sequence of carrier-frequency square wave pulses whose polarity can be reversed after each half period of the modulation frequency. Both methods eliminate the necessity of an analogous multiplication for generating the modulated signal and thus allow for a particularly high linearity of the sensor signal. The filtration of the generated square wave signals which is required for evaluation is advantageously performed partially in the resonance circuit of the movable element and partially in the reception path of the integrated circuit.

As described above, for a large variety of uses, inductive position sensors are given a design with multiple channels. In doing so, the subsystems are often provided in close spatial proximity. Due to the spatial closeness of the coils of different subsystems and in consideration of the further boundary conditions in the designing of the coils (e.g. suitable strength of the coupling factors between the transmitter and the oscillating circuit and between the oscillating circuit and the receiver, highest possible similarity between the inductivities and between the resistances in both transmitter coils of a subsystem, correct angle-dependency of the coupling factors, suppression of the far field of all individual coils, etc.), it will not be generally possible to avoid a mutual coupling of the coils of different subsystems.

This inductive coupling of the coils of the two subsystems (e.g. the oscillating circuit of channel 1 to the receiver of channel 2, or the oscillating circuit of channel 2 to the receiver of channel 1) has the consequence that, to the receiver of one subsystem of a multi-channel sensor, signals of the other subsystem will be supplied. If these coupled-in interference signals of the foreign subsystem are not sufficiently suppressed in the receiver, they have a negative influence on the measured sensor signal. Thus, the described influences from neighboring channels will particularly cause increased noise (stochastic fluctuations) of the measured position signal.

BRIEF SUMMARY OF THE INVENTION

It is an object of the invention to provide an inductive position sensor and particularly a rotational-angle sensor wherein the oscillating circuit excitation is improved, which sensor shall have improved functional properties and shall produce more-reliable results.

According to the invention, the above object is achieved by an inductive position sensor, particularly a rotational-angle sensor, for determining the position of a movable element, said sensor comprising two first transmitter units for generating two site-dependent first alternating fields having an identical first frequency, said first alternating fields being phase-shifted relative to each other by substantially 90°, two second transmitter units for generating two site-dependent second alternating fields having an identical second frequency differing from said first frequency, said second alternating fields being phase-shifted relative to each other by substantially 90°, a first and a second oscillating circuit arranged on or in an element which is movable within the total alternating field generated by said first and second oscillating circuits and the position of which is to be determined, said first oscillating circuit being adapted to be energized by the first total alternating field generated by said first transmitter units and to generate a first oscillating-circuit alternating field having said first frequency, and said second oscillating circuit being adapted to be energized by the second total alternating field generated by said second transmitter units and to generate a second oscillating-circuit alternating field having said second frequency, a first receiver unit receiving said first oscillating-circuit alternating field, a second receiver unit receiving said second oscillating-circuit alternating field, a first evaluating unit for determining the phase shift between said first oscillating-circuit alternating field and at least one of said two first alternating fields, and a second evaluating unit for determining the phase shift between said second oscillating-circuit alternating field and at least one of said two second alternating fields, said two first transmitter units, said first oscillating circuit, said first receiver unit and said first evaluating unit forming a first subsystem, and said two second transmitter units, said second oscillating circuit, said second receiver unit and said second evaluating unit forming a second subsystem, said first transmitter units and said second transmitter units are alternately controllable to alternately generate said first and second alternating fields, and said subsystems, without being galvanically connected to each other, being coupled to each other in such a manner that one said subsystem is adapted to detect when no alternating fields are generated anymore in another subsystem or in the other subsystems.

Figure 2:
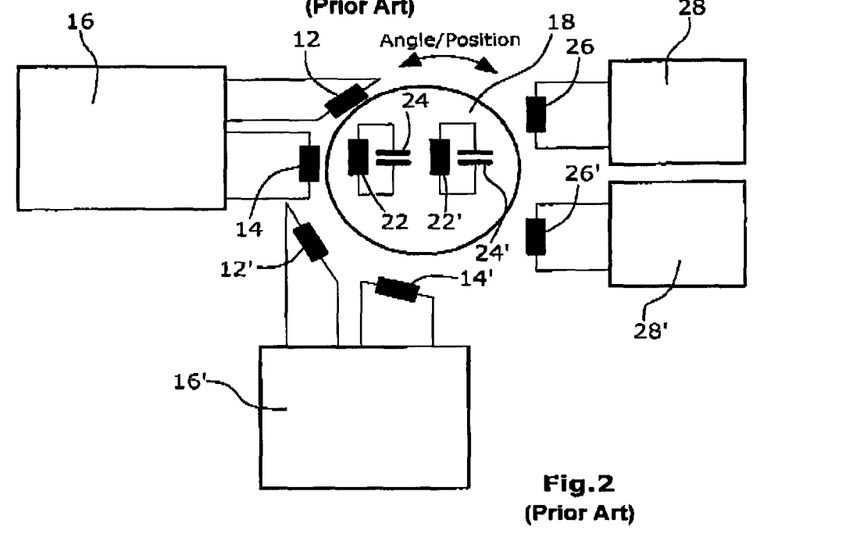
FIG. 2 is a view illustrating the basic principle of an inductive position sensor of the two-channel type.

The starting point of the invention is the design of an inductive sensor of the type comprising two or more channels, as shown by way of example in FIGS. 1 and 2. The invention sets in with the controlling of the transmitter units of the two channels, which, according to the invention, is performed alternately. According to the invention, it is provided that said two subsystems, without being galvanically connected to each other, are coupled to each other in such a manner that one subsystem will detect when no alternating fields are generated anymore in the other subsystem.

The measure provided by the invention, serving for avoidance of influences from neighboring channels in multi-channel sensor systems of the above described type in spite of the mutual coupling of the coils of the subsystems, consists in the temporally alternating operation of the two subsystems. This operating mode, referred to hereunder as "Alternating Burst Mode" (ABM), does not require changes in the generating of the modulation signals as such and thus avoids a negative influence on important system parameters such as linearity or temperature drift. The ABM evidently requires a synchronization of the subsystems of a multi-channel system so that each channel will start its own transmission operation when no other subsystem is transmitting.

This synchronization evidently could be performed in a very simple manner by communication between the different subsystems of a sensor system via a direct connection.

In multi-channel systems wherein, for reasons of redundancy, the subsystems are realized separately from each other (inclusive of separate integrated evaluation circuits), direct galvanic connections between the two evaluation circuits are often undesired, which is due to considerations regarding the functioning of the system upon failure of a subsystem (fail-safe operation, FMEA). Notably, it must be safeguarded that a malfunction in one of the subsystems cannot affect the other subsystem. In case of a direct galvanic connection between the two subsystems, this would not be excluded. For this reason, the invention proposes to couple the subsystems to each other without establishing a galvanic connection between them, which advantageously can be performed in a capacitive, optical or inductive manner. Of particular advantage is an inductive coupling of the subsystems because the subsystems comprise inductances in form of the individual coils, which are at least parasitically coupled and, respectively, can be optimized in their parasitic coupling in order to couple the subsystems for synchronization of the transmitter units. For the inductive coupling of the subsystems, it is also possible to provide separate inductances which then would exist in addition to the already installed coils (or, more generally, inductances) of these subsystems.

According to an advantageous embodiment of the invention, it is provided that, for synchronizing the alternating control of the transmitter units, either the transmitter units of the subsystems are inductively coupled, or the transmitter units of one subsystem are inductively coupled to the receiver unit of another subsystem, or the oscillating circuit of one subsystem is inductively coupled to the receiver unit and respectively the transmitter units of another subsystem.

Alternatively, the coupling (preferably inductive coupling) of the subsystems, as required for synchronizing the alternating operation of the transmitter units, can be performed via the control units for the transmitter units or via the evaluation units for the receiver units. For realizing this variant, use is made e.g. of a transformer, i.e. the coupling of two inductances which are to be provided in addition to the inductances of the subsystems.

For avoidance of irradiation and for avoidance of incoupling of interference fields, the coils of a sensor systems of the above described type are often designed to the effect that the magnetic far field of two serially connected partial coils will eliminate itself. Frequently, of these two partial coils, only one is active for the actual sensor operation while the other partial coil mainly serves for far-field compensation. Said second partial coil will thus not be subject to the strict requirements with regard to the measurement-amount dependence of the coupling factors and thus can be placed largely in any desired manner.

It is of advantage if, for the inventive non-galvanic coupling of the subsystems, there are now used the far-field compensation coils for synchronization of the transmitter units.

Thus, in its most general form, the invention provides an inductive position sensor, particularly a rotational-angle sensor, which is of the multi-channel type, i.e. comprises at least two subsystems including respectively two transmitter units with control unit, an oscillating circuit and a receiver unit with evaluation unit. The inventive measure of said alternate operation of the individual subsystems and the non-galvanic coupling of the subsystems, provided for synchronization of the alternate operation of the subsystems, is advantageous particularly if no "pure" sine signals are used for controlling the transmitter units. However, the latter in turn is of advantage for a monolithic realization of the controlling of the transmitter unit and for the evaluation units. Further, the alternate operation of the subsystems has the advantage of a reduction of the energy consumption, which, depending on the respective use of the inductive position sensor, may indeed be desirable.

Thus, the generating of the alternate fields by the transmitter units is suitably performed by a substantially sinusoidal signal which preferably can be generated by amplitude modulation of a substantially sinusoidal carrier signal. In this manner, there can be obtained a sinusoidal signal having a relatively low frequency of e.g. 4 KHz by using inductances in the nh-µh range in that these inductances will be excited by a carrier signal having a relatively high frequency of e.g. 4 MHz and an amplitude modulation will take place. In this process, the carrier signal can be suitably generated by applying a square-wave alternating voltage whose repetition frequency is equal to the carrier frequency, whereas the modulation signal is a pulse density signal, having a pulse density varying over time, for generating a sinusoidal and respectively cosinusoidal signal shape, wherein said square-wave alternating signal is applied to the first transmitter units each time for the duration of the pulses of said pulse density signal. Such a generation of sinusoidal signal shapes is described e.g. in WO-A-2007/068765.

BRIEF DESCRIPTION OF THE SEVERAL VIEWS OF THE DRAWINGS

The invention will be described in greater detail hereunder by way of several embodiments and with reference to the drawing. In the individual Figures, the following is shown.

DETAILED DESCRIPTION OF THE INVENTION

Illustrated in FIGS. 1 and 2 are a one-channel inductive position sensor and, respectively, a two-channel inductive position sensor according to the state of the art. For a description of these two Figures, reference is made to the introduction to the specification.

Figure 3:
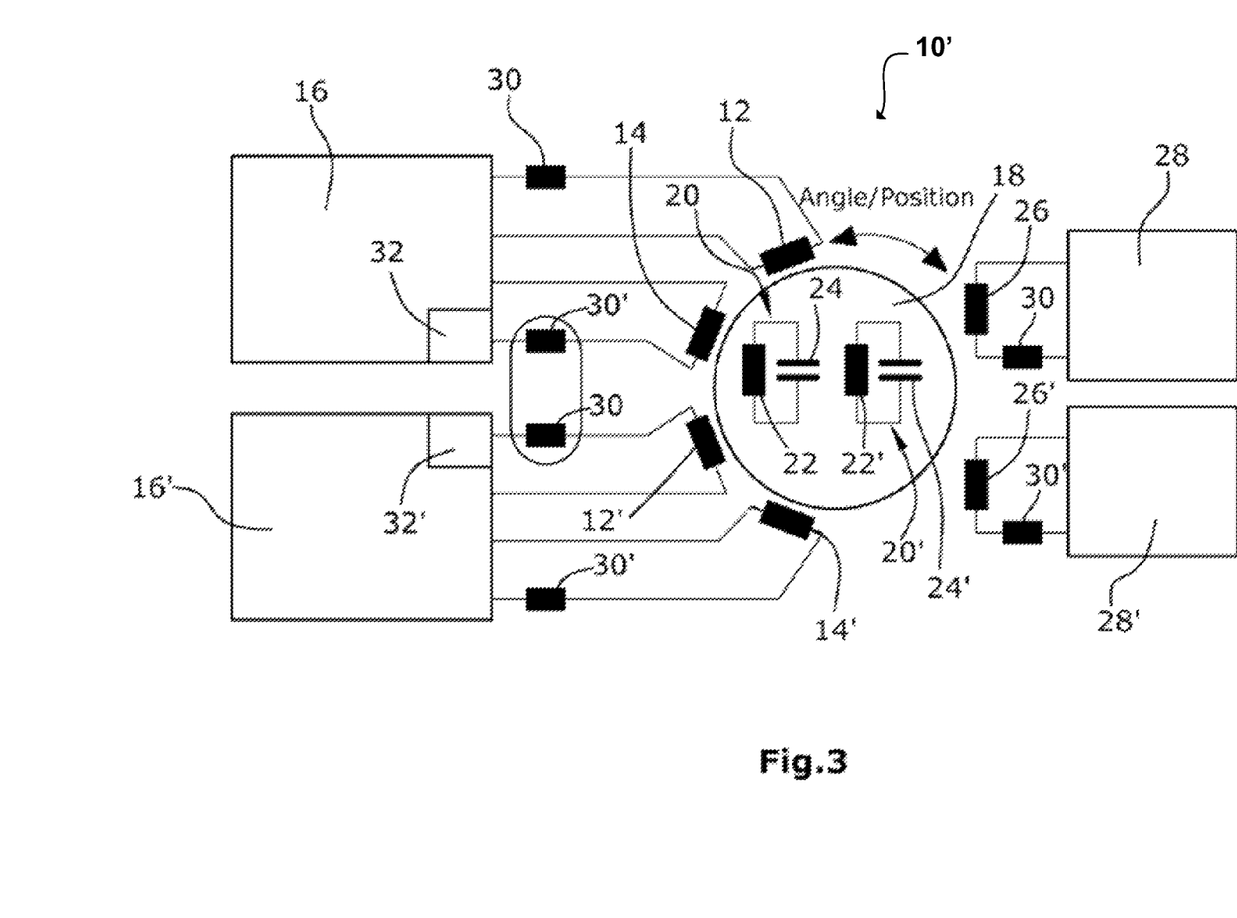
FIG. 3 is a view of a first embodiment of an inductive position sensor with a first option of the inductive coupling of two subsystems of the sensor.

FIG. 3 shows a first embodiment of an inductive position sensor 10' which substantially has the same design as the position sensor according to FIG. 2. In the inductive position sensor 10' of FIG. 3, other than in the position sensor of FIG. 2, there is generated an inductive coupling between the subsystems and, respectively, use is made of a parasitary inductive coupling between the subsystems so as to synchronize the subsystems for the purpose of an alternating operation without requiring a galvanic connection between the subsystems. In the embodiment according to FIG. 3, this inductive coupling is obtained by using the far-field compensation coils 30 of respectively one of the transmitter units 12,14 and 12',14' of the two subsystems. In this context, it should be noted for the sake of completeness that the control unit and the evaluation unit of each subsystem are realized in a common IC.

A method for use in the presently described embodiments in order to synchronize the subsystems of a multi-channel sensor system of the above described type for operation in the alternating burst mode, which method is particularly suitable for integration into an integrated circuit, consists in monitoring the induced signals in one or a plurality of coils of a subsystem for the purpose of detecting a transmission operation of another subsystem of the same sensor system.

During the transmission operation of a first subsystem, all other subsystems should not be transmitting, thus avoiding influences from neighboring channels. Thus, during this period, the active evaluation circuits of these other subsystems can monitor all respectively connected coils (both transmitter coils and the receiver coil) for incoupled signals from the transmitting first subsystem, namely by use of a monitoring circuit 32 assigned to each subsystem, and they will be allowed to begin their own transmission operation only when no incoupling of another subsystem can be detected anymore. Particularly, the monitoring according to the invention is not restricted to the receiver coil but can be performed on a suitable selection of the system coils of the subsystems, depending on the respective system design. This monitoring will guarantee the alternating (i.e. non-overlapping) operation, as required for avoidance of influences from neighboring channels, in the alternating burst mode. The method requires neither direct connections, nor connections via capacitors or resistors, between the subsystems, but is performed by utilizing the inductive coupling—often existing anyway—between the coils of the various subsystems and thus, for the reasons mentioned, is suited for systems which are subject to high safety requirements.

This behavior is particularly advantageous in case of integration into an integrated evaluation circuit because no additional outer terminals (pins) will be necessitated therefor. Further, in an integrated circuit, switching the coils from the transmitter to the respective monitoring circuit and back will be possible without higher additional expenditure.

In the embodiment according to FIG. 3, the—often already existing—inductive couplings between the coils of different subsystems (e.g. from the transmitter coils of subsystem 1 to the transmitter coils of subsystem 2, or from the oscillating circuit of system 1 to the receiver coils of system 2) are used for detection of a transmission operation in another subsystem. A possibility for a well-aimed increase of such couplings without adversely affecting the other coil systems resides in a coupling between the far-field compensation coils 30 which often are required anyway.

In the embodiment of the coil arrangement of the inductive position sensor 10' according to FIG. 3, these far-field compensation coils 30,30' and particularly the degrees of freedom in the designing and positioning of these coils are utilized for generating an inductive coupling (of the coils) of different subsystems. Thus, in the embodiment according to FIG. 3, the monitoring circuit 32 will detect the transmission signals of the transmitter units 14' and 12' of another subsystem that have been induced into the far-field compensation coil 30 of the transmitter units 14 and 12 of one subsystem.

Figure 4:
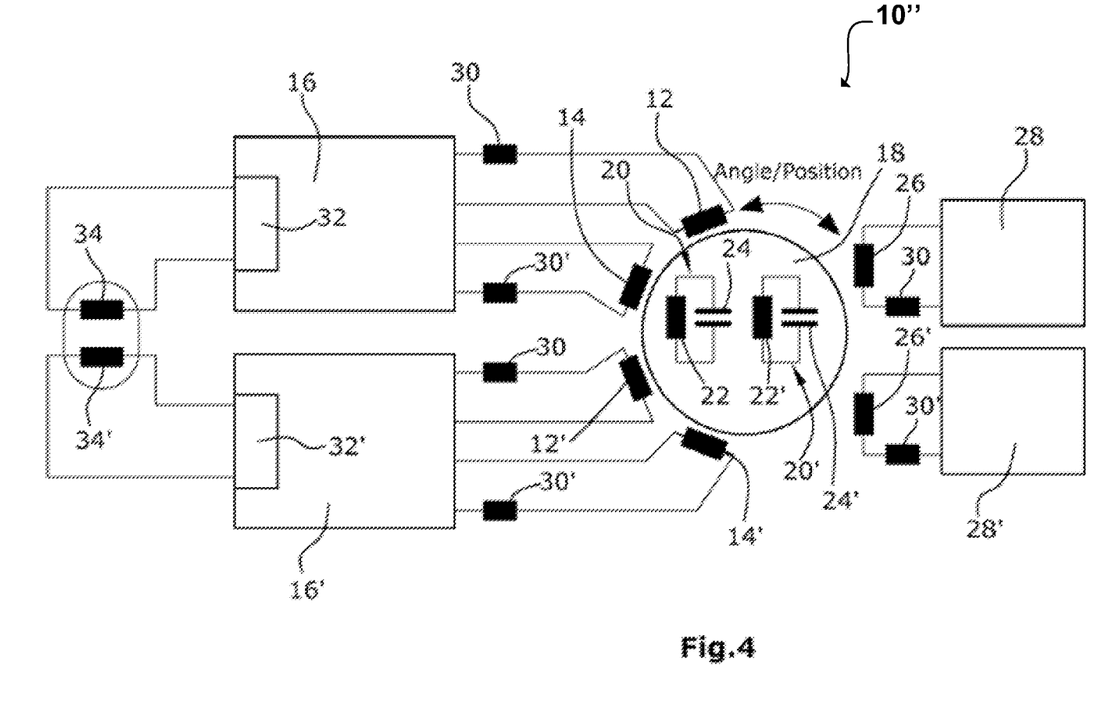
FIG. 4 is a view of a further embodiment of an inductive position sensor with inductive coupling of the subsystems, and FIG. 5 a final embodiment of an inductive position sensor with inductive coupling of the subsystems.

In the embodiment of the position sensor 10" according to FIG. 4, the inductive coupling of the two subsystems is effected by two additional inductances 34,34' provided especially for this purpose, whose incoupled signals are detected by the monitoring circuits 32.

Figure 5:
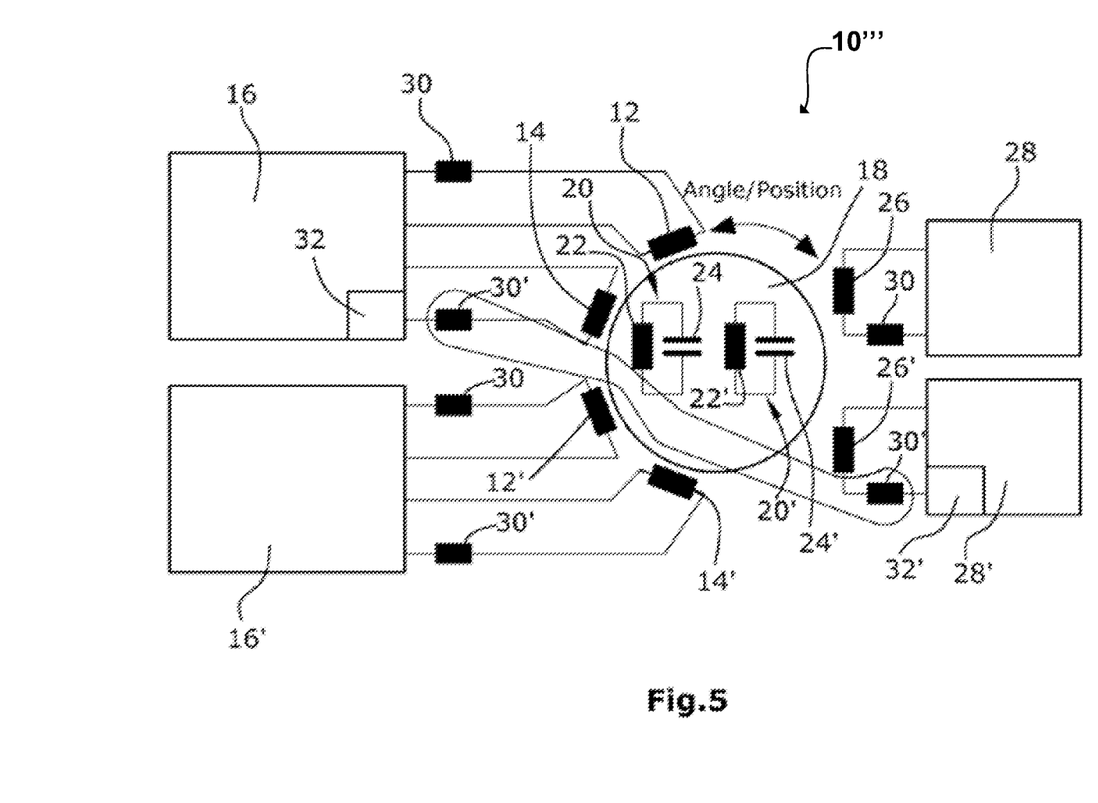

In the embodiment of the inductive position sensor 10''' according to FIG. 5, the inductive coupling of the two subsystems is effected again by utilizing the anyway existing field compensation coils 30,30', notably, in this case, by use of the field compensation coil 30 of the transmitter unit 14 of one subsystem and the field compensation coils 30,30' of the receiver unit 26' of the other subsystem.

The invention claimed is:

1. An inductive position sensor, particularly a rotational-angle sensor, for determining the position of a movable element, said sensor comprising:
two first transmitter units for generating two site-dependent first alternating fields having an identical first frequency, said first alternating fields being phase-shifted relative to each other by substantially 90°,
two second transmitter units for generating two site-dependent second alternating fields having an identical second frequency differing from said first frequency, said second alternating fields being phase-shifted relative to each other by substantially 90°,
a first and a second oscillating circuit arranged on or in an element which is movable within the total alternating field generated by said first and second oscillating circuits and the position of which is to be determined,
said first oscillating circuit configured to be energized by the first total alternating field generated by said first transmitter units and to generate a first oscillating-circuit alternating field having said first frequency, and
said second oscillating circuit configured to be energized by the second total alternating field generated by said second transmitter units and to generate a second oscillating-circuit alternating field having said second frequency,
a first receiver unit receiving said first oscillating-circuit alternating field,
a second receiver unit receiving said second oscillating-circuit alternating field,
a first evaluating unit for determining the phase shift between said first oscillating-circuit alternating field and at least one of said two first alternating fields, and
a second evaluating unit for determining the phase shift between said second oscillating-circuit alternating field and at least one of said two second alternating fields,
said two first transmitter units, said first oscillating circuit, said first receiver unit and said first evaluating unit forming a first subsystem, and said two second transmitter units, said second oscillating circuit, said second receiver unit and said second evaluating unit forming a second subsystem, wherein said subsystems, without being galvanically connected to each other, are coupled to each other in such a manner that one said subsystem is configured to detect when no alternating fields are generated anymore in another subsystem or in the other subsystems and said first transmitter units and said second transmitter units are alternately controllable to alternately generate said first and second alternating fields based on detecting when no alternating fields are generated.

2. The inductive position sensor according to claim 1, wherein said two subsystems are coupled to each other in a capacitive, optical or inductive manner.

3. The inductive position sensor according to claim 1, wherein said two subsystems are inductively coupled to each other and that, to each subsystem, an inductance is assigned which can be excited during operation of the subsystem, said inductances being coupled to each other.

4. The inductive position sensor according to claim 3, wherein said inductances are components of the subsystems and are provided for the function of the subsystems.

5. The inductive position sensor according to claim 4, wherein said first and second transmitter units, said first and second oscillating circuits and said first and second receiver units each comprise at least one inductance and that one of the inductances of the first subsystem is coupled to one of the inductances of the second subsystem.

6. The inductive position sensor according to claim 1, wherein a first control unit for the first transmitter units is coupled to a second control unit for the second transmitter units, without said two control units for the first and second transmitter units or said two evaluation units of the two receiver units being galvanically connected to each other or the control unit of this subsystem being galvanically connected to the evaluation unit of another subsystem.

7. The inductive position sensor according claim 1, wherein said first and second transmitter units comprise first and respectively second transmitter coils and that one of said first transmitter coils is inductively coupled to one of said second transmitter coils.

8. The inductive position sensor according claim 1, wherein said first and second transmitter units comprise transmitter coils and said first and second receiver units comprise receiver coils, wherein, for avoidance of an incoupling of interference fields, a far-field compensation coil is connected in parallel to each transmitter coil and respectively each receiver coil in such a manner that the magnetic far field of the two serially arranged coils substantially eliminates itself, and that the far-field compensation coil of at least one of said first transmitter coils or of said first receiver coils of a subsystem is inductively coupled to the far-field compensation coil of at least one of the second transmitter coils or the second receiver coils of another subsystem.

9. The inductive position sensor according claim 1, wherein, for generating said alternate fields, a respective substantially sinusoidal signal can be supplied to said transmitter units.

10. The inductive position sensor according to claim 9, wherein said sinusoidal signal can be generated by amplitude modulation of a substantially sinusoidal carrier signal.

* * * * *

UNITED STATES PATENT AND TRADEMARK OFFICE
CERTIFICATE OF CORRECTION

PATENT NO. : 8,542,007 B2  
APPLICATION NO. : 12/922667  
DATED : September 24, 2013  
INVENTOR(S) : Brands et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Fifteenth Day of September, 2015

Michelle K. Lee
*Director of the United States Patent and Trademark Office*